April 26, 1949.  J. DI JOSEPH  2,468,490
PIPE CLEANING POWER CABLE FEEDER

Filed March 15, 1945  3 Sheets-Sheet 1

INVENTOR.
John Di Joseph
BY Joshua R. W. Potts
HIS ATTORNEY.

April 26, 1949.  J. DI JOSEPH  2,468,490
PIPE CLEANING POWER CABLE FEEDER
Filed March 15, 1945  3 Sheets-Sheet 3

INVENTOR.
John Di Joseph
BY
HIS ATTORNEY.

Patented Apr. 26, 1949

2,468,490

UNITED STATES PATENT OFFICE 2,468,490

PIPE CLEANING POWER CABLE FEEDER

John Di Joseph, Philadelphia, Pa.

Application March 15, 1945, Serial No. 582,973

6 Claims. (Cl. 15—104.30)

This invention relates to cable feeders and is concerned primarily with the feeding of a cable which is intended to be employed as a rotary drive shaft for a tool, such as a reamer which is utilized in cleaning out obstructions from conduits.

At the present time artisans, such as plumbers, electricians and others working with conduits, are confronted with the problem of removing obstructions from conduits so as to leave the bore free from restrictions. A cutting tool, in the nature of a reamer, is mounted on one end of a flexible cable and driven by rotation of said cable. Obviously, such a cable may be inserted into a conduit past bends, curves and other deformations.

With the above outlined background in mind, the invention has in view, as its foremost objective, the provision of mechanism for feeding cable under power into conduits and similar places. In carrying out this idea, in a practical embodiment, the inventor proposes to use the same means which rotates the cable to perform the reaming operations, as the means for causing its feeding under power.

A flexible cable now meeting with approved usage in this field, and one which is generally available to the public includes an outer casing that is defined by a helically wound spring wire. A further object of the invention is a provision of power cable feeding mechanism which is particularly adapted for cooperation with a cable of this type.

More in detail, the invention has, as an object, the provision of cable feeding mechanism including a reel which may be either power or hand actuated. The flexible cable is wound on this reel. After coming off the reel, the cable is suitably guided into a tubular element which is substantially in alignment with the axis of the reel. This tubular element is provided with means which engages the helical cable casing, so that upon rotation of the casing rectilineal movement is imparted to the cable. Thus, if the reel is rotated in one direction, the cable is paid out; while if it is rotated in the opposite direction, it is taken in.

Under many conditions of actual usage, it is not necessary to pay out or take in the cable under power, or even under conditions of mechanical advantage. Under these conditions, it is desirable that the cable be susceptible of being manually pulled from the reel or wound thereon by pushing the cable. In view of these conditions, a further object is the provision, in power feeding cable mechanism of the type above set forth, of retractable means for engaging the cable in the tubular element, and which means, when in engagement with the cable, creates a rectilineal component, as an incident of rotation to the cable. When this means is retracted, the cable may be pulled through the tubular element in either direction without, in any way, being affected by this means.

Still another object of the invention is the provision, in mechanism of the character aforesaid, of cable engaging means which takes the form of retractable knife blades. These knife blades are mounted on a screw threaded stem, so that upon rotation of the latter, the blades may be moved into or out of engagement with the cable.

Another important object of the invention is tied up with this feature of directly pulling the cable from the reel, or pushing it thereonto. This object is the provision, in mechanism of the character aforesaid, of a cable guide which is rotatably mounted between the knife blades aforesaid and the reel. This rotatable guide may rotate independently of the reel which permits the cable to be paid out or taken in, while the reel remains stationary.

A further object of the invention is the provision, in mechanism of the type noted, of highly simplified power means for rotating the reel in reverse directions. In attaining this end an electric motor is included in the mechanism and embodies a drive shaft that carries a friction driving element. This element is movable into engagement with one surface of the reel to drive it in one direction, and into engagement with another surface to drive it in the opposite direction.

A further and important object of the invention is the provision of power cable feeding mechanism which includes all of the features outlined above, and yet which is highly simplified as to construction and operation.

Various other more detailed objects and advantages of the invention such as arise in connection with carrying out the above noted thoughts in a practical embodiment, will in part become apparent, and in part be hereinafter stated as the description of the invention proceeds.

The invention, therefore, comprises a power cable feeder, including a rotating reel that is adapted to be driven in reverse directions by an electric motor, together with a tubular element substantially in alignment with the axis of said reel, and with which are associated retractable knife blades, and interposed between this tubular element and the reel is a rotatable cable guide. The reel is susceptible of being hand actuated in event a source of power is not available.

For a full and more complete understanding of the invention, reference may be had to the following description and accompanying drawings, wherein:

Figure 5 is an enlarged, fragmentary, detail view of certain elements associated with the cable controlling means.

Figure 1:
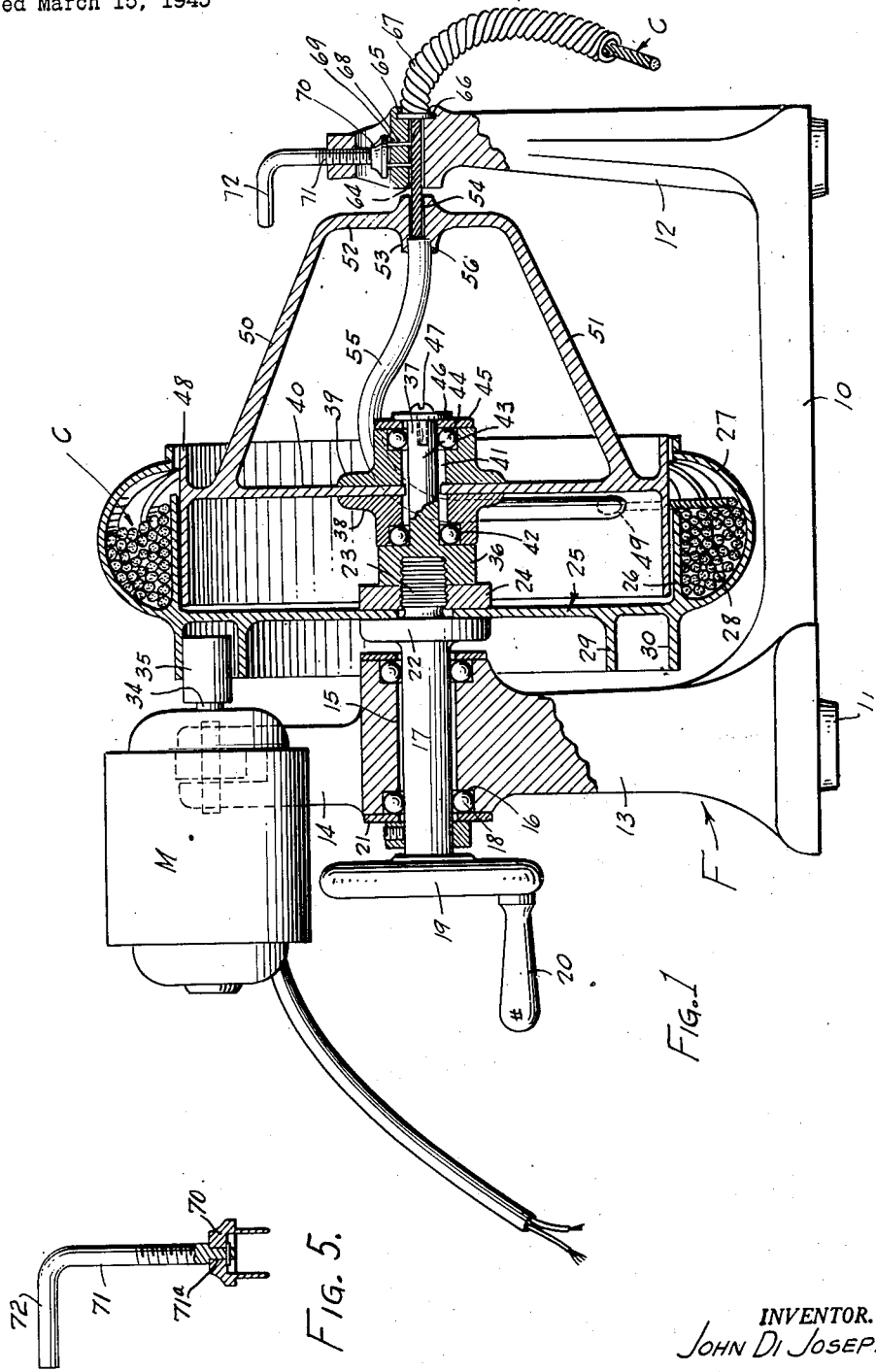
Figure 1 is a side view, partly in elevation but largely in section, of power cable feeding mechanism embodying the precepts of this invention.

Referring now to the drawings wherein like reference characters denote corresponding parts, a supporting framework is referred to in its entirety by the reference character F. The framework F includes a base 10, which may be provided with feet 11, which are adapted for support on a suitable surface.

Upstanding from what is called the forward end of the base 10 is a front upright 12, while a rear upright 13 extends upwardly from the opposite end. This rear upright 13 may continue upwardly, but at an angle, to provide an offset arm 14, which is employed as a carrier for the electric motor, as will be later pointed out.

The upper end of the rear upright 13 is somewhat enlarged in thickness, as shown in Figure 1, and this enlarged portion is formed with a bore 15. Each end of the bore 15 is counterbored, as indicated at 16, to provide ball races. A shaft 17 extends through bore 15 and is rotatably mounted on bearings 18, which are received in the races 16.

At the outer or rear end, the shaft 17 may be provided with any desired form of means which permits a manual operation in the event power should fail, or no source should be available. In the form of the invention illustrated, this manually operable means takes the form of a wheel 19, having a handle 20. As shown in Figure 1, each of the races defined by the counterbore 16, may be closed by washers shown at 21.

The inner or front end of the shaft 17 carries a hub 22 from which extends a threaded stub 23. A nut 24 is screwed onto the stub 23, and clamped between this nut 24 and the hub 22 is a driving disc 25, which carries an inner forwardly projecting cylindrical flange 26. Extending outwardly and forwardly from the peripheral edge of the disc 25 is a curved casing 27 which cooperates with the outer surface of the flange 26 to provide the reel space designated 28. It will be noted that the flange 26 is appreciably shorter than the curved casing 27, thus providing ample room for feeding cable into the reel space, as will be later described.

Figure 2:
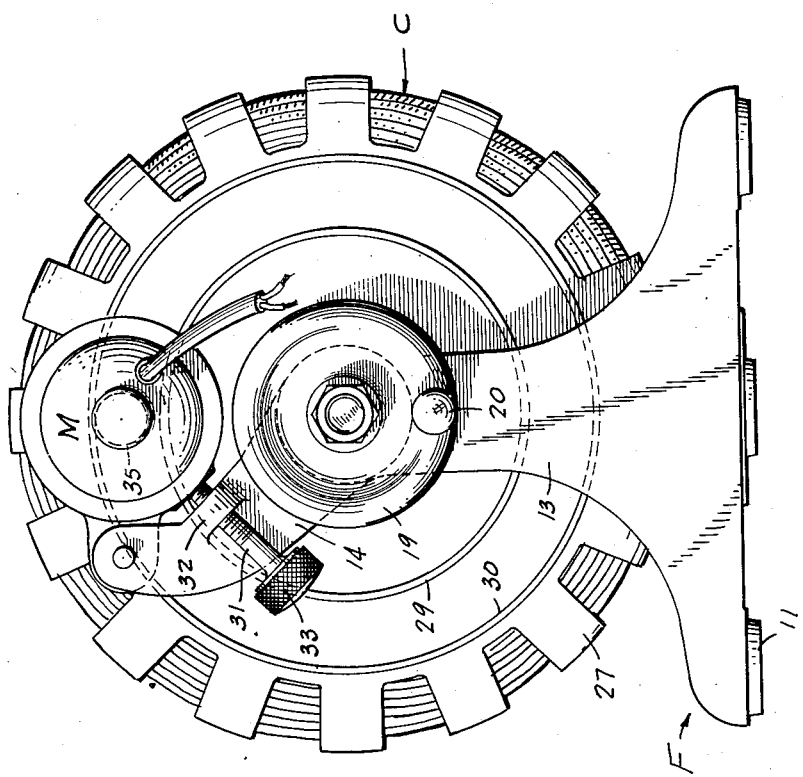
Figure 2 is a view in end elevation, looking at the left hand side of Figure 1.

Extending rearwardly from the driving disc 25 are spaced apart inner and outer driving flanges 29 and 30, respectively. An electric motor referred to generally as M is hingedly mounted on an arm 14 (see Figure 2) and this is adjustedly positioned by a screw 31 that is threaded through an ear 32 which is preferably formed integrally with the arm 14. At its lower or outer end, the screw 31 carries a knurled knob 33, which may be employed to rotate the screw 31 and adjust the position of the motor M.

Extending forwardly from the motor M is a drive shaft 34, which is shown more clearly in Figure 1, and the drive shaft 34 carries a friction driving element 35 which may take the cylindrical form illustrated. The driving element 35 has a diameter somewhat less than the diametrical distance between the driving flanges 29 and 30, so that when the friction element 35 is in engagement with one of these flanges, it is out of engagement with the other. Assuming that the motor M is always driven in one direction, it is notable that engagement with the outer driving flange 30, as illustrated in Figure 1, will rotate the disc 25 in one direction, while engagement with the driving flange 29 rotates the disc in the opposite direction.

Threaded onto the stub 23, over the nut 24, is a cap member 36, from which extends forwardly a shaft section 37. Complemental hub elements 38 and 39 have clamped therebetween a carrier disc 40. These hub elements 38 and 39 are provided with aligned bores 41, each of which is counterbored, as indicated at 42 and 43. Ball bearing elements 44 are received in the races defined by the counterbores 42 and 43, and are disposed about the shaft section 37. It will be noted that the race defined by the counterbore 42 is closed by cap 36, while the race defined by the counterbore 43 is closed off by an end closure 45, which is held in position by a washer 46 that is anchored by a screw element 47 threaded in a socket in the end of the shaft section 37.

The outer periphery of the carrier disc 40 is provided with a cylindrical casing 48 which extends an appreciable distance on each side of the disc 40. This casing 48 has a diameter slightly less than that of the cylindrical flange 26, thus providing a slight spacing between these elements. It is important to note that the casing 48 is also formed with an opening, shown at 49, and represented by dotted lines in Figure 1.

The flexible cable is intended to be passed through this opening 49 to the reel space 28, as will be later explained.

Extending forwardly from the front face of the disc 40 are a pair of spider arms 50 and 51 which converge toward the axis of the shaft 17 and which, at their forward ends, carry a circular plate 52 which preferably is integral therewith. The central portion of plate 52 is enlarged to provide a boss-like structure 53 which is provided with a bore 54, the axis of which is in substantial alignment with the axis of shafts 17 and 37.

A cable guide 55 may be fashioned from any appropriate material, and this cable guide takes the form of a tube which may be bent into a compound curve, and which might be described as being a deformed S. One end of the cable guide 55 is secured to the cylindrical casing 48 at the opening 49 with which it communicates; while the other end is received in the counterbore 56 formed in the boss 53.

Figure 4:
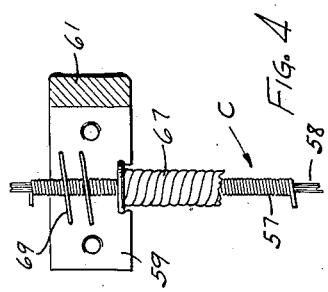
Figure 4 is a detailed bottom plan, partly in section and partly in elevation, bringing out the relation of the cable to the knife blades.

Referring now more particularly to Figure 4, a flexible cable of the type with which the presently described mechanism is particularly adapted to cooperate is therein illustrated and referred to generally by the reference character C. This cable C includes as an essential element, a casing 57 made up of a spring wire wound into a close helix. A core, shown at 58, may be enclosed by the casing 57. The cable C is wound on the cylindrical flange 26 within the reel space 28 and passes through the opening 49 into the cable guide 55, and extends through the latter, From the cable guide 55, cable C passes through the bore 54.

Figure 3:
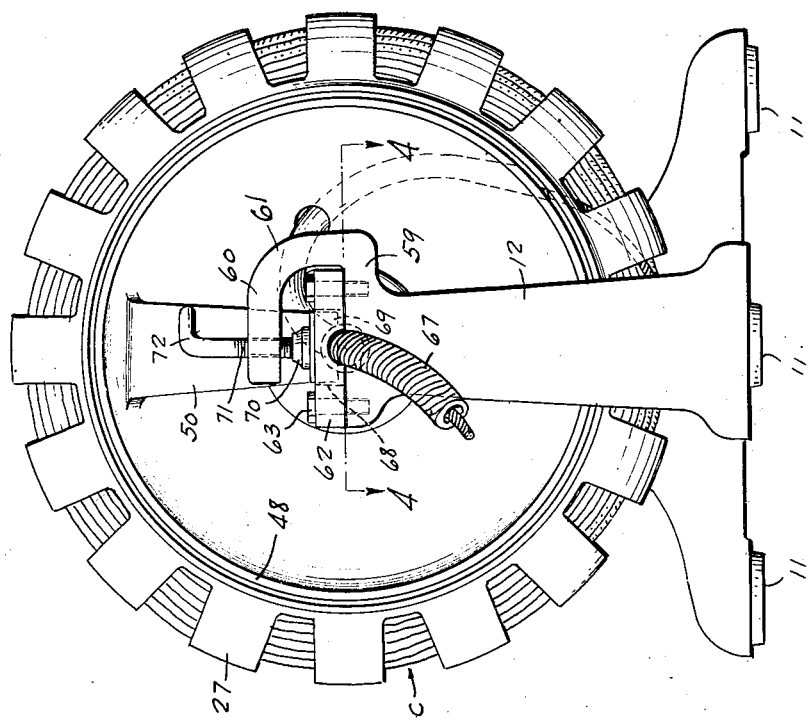
Figure 3 is a similar and elevational showing, looking from the opposite side.

Referring now more particularly to Figure 3, the front upright 12 is shown as terminating in a flat table-like part 59 which constitutes one arm of a yoke that also includes a top arm 60 and a generally upwardly extending bend 61. A plate 62 is positioned on the table-like top 59 beneath the yoke arm 60 and may be held in position in any preferred manner, such as by screw fastening elements, shown at 63. The table part 59 and plate 62 are formed with complemental recesses which together define a passage 64 that is substantially in alignment with the bore 54. The cable C extends from the bore 54 over into and through the passage 64. It will be noted that the forward end of this passage 64 is enlarged to provide a recess 65 in which is received an anchoring plate 66 that is carried at one end of a flexible guide 67.

The cable C also passes through this flexible guide 67 and thence to the conduit into which it is to be fed. The plate 62 is provided with spaced slots 68 and slidably positioned in each slot 68 is a knife blade 69. These knife blades 69 have edges which are adapted for engagement with the helical grooves in the casing 57 of the cable C.

The knife blades 69 are mounted on a carrier 70 which is swivelled on a reduced portion 71a at one end of a threaded stem 71. The upper end of the stem 71 may be provided with any appropriate operating means, such as the handle shown at 72.

The operation of the above described mechanism is outlined, by first noting that under many conditions of usage, it is not necessary to retract the cable under power, or by operation of the reel. Under these conditions, the handle 72 may be availed of to rotate the stem 71 and retract the carrier 70 and consequently the knife blades 69 from engagement with the cable C. The operator may then merely grasp that part of the cable C which projects from the flexible guide 67, and pull or push it as occasion demands. In either event, the reel made up of flange 26 and casing 27 remains stationary while the carrier disc 40, casing 48 and cable guide 55, rotate to either pay out or wind up the cable from the reel space 28. However, when it is desired to feed the cable C under power, the handle 72 is operated to move the knife blades 69 into effective engagement with the helical casing 57 of the cable C. The motor M is now moved into engagement with one of the driving flanges 29 and 30, depending upon the direction of rotation required. The motor is then started into operation and drives the disc 25 and the associated reel structure carried thereby. This rotation of the reel imparts a rotation to the cable C and because of the helical casing and its engagement with the knife blades a rectilineal component of movement is generated which pushes the cable outwardly. Of course, rotation in a reverse direction will retract the cable and take it up in the reel space 28.

Should there be no source of power available, the same operation may be accomplished manually by rotating the hand wheel 19, although this operation will not prove to be as convenient or as quickly achieved as by use of the motor.

While a preferred specific embodiment of the invention is hereinbefore set forth, it is to be clearly understood that the invention is not to be limited to the exact constructions illustrated and described, because various modifications of these details may be provided in putting the invention into practice within the purview of the appended claims.

What is claimed is:

1. In a power cable feeder, a framework, a shaft journaled in said framework, a reel drivably mounted on said shaft and having reel space adapted to receive a flexible cable, said reel being suspended in over-hung relation at one end of said shaft, an electric motor carried by said framework, driving connections between said electric motor and said reel for rotating said reel in either of opposite directions, a cylindrical cable feeding casing within said reel and rotatably mounted on said shaft, said casing having an opening communicating with said reel space, a tubular cable guide carried by said casing and having one end communicating with said opening, while the other end is disposed substantially in alignment with the axis of said shaft, a tubular element in alignment with the last mentioned end of said guide, and inclined knife blades associated with said tubular element and adapted to engage a cable to create a rectilineal component of movement as an incident to rotation thereof.

2. In a cable holder, a drum-shaped casing having a peripheral flange extending from a circular side member, a cable holding cage also extending from the peripheral edge of said side member, means rotatably supporting said casing with the casing suspended in overhung relation to the supporting means, a cable feeding element inserted and rotatable within the extending flange of the casing, means rotatably supporting said element by the supporting means of the casing, said feeding element communicating with said cage, a hub extending outwardly and supported from said element, a guiding element positioned in alignment and communicating with the hub, means in the guiding element for paying a cable with spiral grooves in its surface held therein outward as the cable is rotated, and means rotating said casing.

3. In a cable holder, a drum-shaped casing with a peripheral cable holding section forming a reel, means rotatably mounting said casing from one side thereof, a hollow cylindrically-shaped element inserted within said casing, having an axially extending cable guide, said guide communicating with said section, means mounting said element also from one side of the mounting means of the casing, an auxiliary cable guide aligned with the guiding member of the element, and means rotating said casing.

4. In a cable holder, a drum-shaped casing with a peripheral cable holding section forming a reel, means rotatably mounting said casing from one side thereof, a hollow cylindrically-shaped element inserted within said casing, said element having an axially extending cable guide, said guide communicating with said section, means mounting said element also from one side on the mounting means of the casing, an auxiliary cable guide aligned and communicating with the guiding member of the element, and means rotating said casing, said cylindrically-shaped element being adapted for rotation independent of the casing to feed cable to the casing.

5. In a cable holder, a drum-shaped casing having a peripheral flange extending from a circular side member, a cable holding cage also extending from the peripheral edge of said side member and extending beyond the edge of said flange, means rotatably supporting said casing through said side member with the casing suspended in over-hung relation to the supporting means, a complementary cable feeding element having a peripheral flange rotatable within the extending flange of the casing and having a circular web therein, means rotatably supporting said element through the circular web by the supporting means of the casing, a hub extending outwardly and supported from said circular web, the axis of said hub being positioned in axial alignment with the web and side element of the casing, a tubular element extending from the outer end of the hub to an opening through the flange of the web providing passage for a cable from the cage of the casing to the hub, a guiding element positioned in alignment with the hub, means in the guiding element for paying a cable with spiral grooves in its surface held therein outward as the cable is rotated, and means rotating said casing through the side member, said cable feeding element being mounted for rotation independent of the casing for feeding a cable to the cable cage section of the casing.

6. In a cable holder, a drum-shaped casing having a peripheral flange extending outward from a circular side member, a substantially semi-circular section cable holding cage also extending from the peripheral edge of said side member and extending beyond the edge of said flange, means rotatably supporting said casing through said side member with the casing suspended in over-hung relation to the supporting means, a complementary cable feeding element having a peripheral flange rotatable within the extending flange of the casing and having a circular web therein, means rotatably supporting said element through the circular web by the supporting means of the casing, a hub extending outwardly and supported from said circular web, the axis of said hub being positioned in axial alignment with the web and side member of the casing, means guiding the cable from the adjacent end of the hub to an opening through the flange of the cable feeding element providing passage for a cable from the cage of the casing to the hub, a guiding element positioned in alignment with the hub, means in the guiding element for paying a cable with spiral grooves in its surface held therein outward as the cable is rotated, means rotating said casing through the side member, and axially disposed means rotating said casing through frictional contact with an extending flange of the said side member.

JOHN DI JOSEPH.

REFERENCES CITED

The following references are of record in the file of this patent:

UNITED STATES PATENTS

| Number | Name | Date |
| --- | --- | --- |
| 138,444 | Simmons | Apr. 29, 1873 |
| 1,248,178 | Sergeant | Nov. 27, 1917 |
| 1,722,512 | Wilt | July 30, 1929 |
| 1,751,415 | McCaffrey | Mar. 18, 1920 |
| 1,912,525 | Hotchkiss, Jr. | June 6, 1933 |
| 2,037,103 | Yohn | Apr. 14, 1936 |
| 2,111,527 | Blanc | Mar. 15, 1938 |
| 2,201,733 | Kollman | May 21, 1940 |
| 2,223,005 | Kerker | Nov. 26, 1940 |
| 2,267,493 | Clotz | Dec. 23, 1941 |
| 2,282,600 | Blanc | May 12, 1942 |
| 2,320,309 | Smith | May 25, 1943 |

FOREIGN PATENTS

| Number | Country | Date |
| --- | --- | --- |
| 278,879 | Great Britain | Aug. 8, 1932 |